US012654949B2

(12) United States Patent
Ogawa et al.

(10) Patent No.: US 12,654,949 B2
(45) Date of Patent: Jun. 16, 2026

(54) CONVEYANCE DEVICE

(71) Applicants: DAIFUKU CO., LTD., Osaka (JP);
HONDA MOTOR CO., LTD., Tokyo
(JP)

(72) Inventors: Kazuki Ogawa, Shiga (JP); **Hiroaki
Nomoto, Tokyo (JP); Saeko Komatsu**,
Tokyo (JP)

(73) Assignees: DAIFUKU CO., LTD., Osaka (JP);
HONDA MOTOR CO., LTD., Tokyo
(JP)

(*) Notice: Subject to any disclaimer, the term of this
patent is extended or adjusted under 35
U.S.C. 154(b) by 156 days.

(21) Appl. No.: 18/590,623

(22) Filed: Feb. 28, 2024

(65) Prior Publication Data

US 2024/0294341 A1     Sep. 5, 2024

(30) Foreign Application Priority Data

Mar. 3, 2023     (JP) ................................. 2023-033173

(51) Int. Cl.
*B65G 35/08*          (2006.01)

(52) U.S. Cl.
CPC .................................... *B65G 35/08* (2013.01)

(58) Field of Classification Search
USPC ................................................ 198/831, 802
See application file for complete search history.

(56) References Cited

U.S. PATENT DOCUMENTS

| | | | | |
|---|---|---|---|---|
| 7,168,556 | B2 * | 1/2007 | Spoeler ................. | B62D 65/18 |
| | | | | 198/465.2 |
| 7,891,482 | B2 * | 2/2011 | Takahashi .............. | B65G 35/06 |
| | | | | 198/581 |
| 9,394,021 | B2 * | 7/2016 | Okazaki ............... | B65G 17/066 |
| 9,764,903 | B2 * | 9/2017 | Okazaki ................. | B65G 35/06 |
| 2016/0107711 | A1 | 4/2016 | Okazaki et al. | |
| 2016/0159577 | A1 | 6/2016 | Okazaki et al. | |

FOREIGN PATENT DOCUMENTS

| | | |
|---|---|---|
| JP | 48-011707 | 2/1973 |
| JP | 2016-78984 | 5/2016 |
| WO | 2015/5164 | 1/2015 |

OTHER PUBLICATIONS

Office Action for JP Application No. 2023-033173, dated Jan. 28,
2025, 3 pages.

* cited by examiner

*Primary Examiner* — William R Harp
(74) *Attorney, Agent, or Firm* — Casimir Jones, S.C.;
Thomas J. Lyneis

(57) ABSTRACT

Achieved is a conveyance device including a mechanism
which reduces a gap to be generated between each of
carriages coupled to each other and a path along which the
carriages pass. A conveyance device (1) to be conveyed
along a conveyance path (6) includes: a plurality of main
carriages (2); and a plurality of sub-carriages (3) that are
located between the main carriages and that are connected so
as to be movable with respect to the main carriages. The
main carriages and the sub-carriages are alternately pro-
vided. The sub-carriages each include a step (7) configured
to be drawn therefrom in a direction perpendicular to a
movement direction of a conveyance path and in an area in
which the conveyance path bends.

8 Claims, 7 Drawing Sheets

CONVEYANCE DEVICE

This Nonprovisional application claims priority under 35 U.S.C. § 119 on Patent Application No. 2023-033173 filed in Japan on Mar. 3, 2023, the entire contents of which are hereby incorporated by reference.

TECHNICAL FIELD

The present invention relates to a conveyance device.

BACKGROUND ART

A production line for reducing a burden on operators of movement is built in a factory. In such a production line, a conveyance device is used in which a series of carriages for carrying conveyance targets (for example, automobiles) is provided and which moves the carriages along a predetermined conveyance path. The operators load, on the carriages, components to be assembled and finish assembling a conveyance target on each of the carriages in a time period during which the carriages move along the predetermined conveyance path. This reduces horizontal movement of the operators in a factory for conveying the components. Thus, the operators can perform efficient operations.

Patent Literature 1 discloses a conveyance device constituted by first carriage members carrying conveyance targets and second carriage members connecting the first carriage members. Here, the first carriage members each have an outer edge whose front and back portions have arc shapes in order to prevent the first carriage members from interfering with each other in an area in which a conveyance path turns around. The second carriage members are shaped so as to fill spaces between the first carriage members.

CITATION LIST

Patent Literature

[Patent Literature 1]
    Japanese Patent Application Publication Tokukai No. 2016-078984

SUMMARY OF INVENTION

Technical Problem

The first carriage members being carrying the conveyance targets move along the conveyance path. Unfortunately, each of the second carriage members connecting the first carriage members moves in accordance with a positional relationship with the first carriage members that are adjacent to the second carriage member, and a gap is generated between the conveyance device and a platform in the area in which the conveyance path turns around.

It is an object of an aspect of the present invention to achieve a conveyance device including a mechanism which moves together with carriages coupled to each other and reduces a gap between each of the carriages and a platform.

Solution to Problem

In order to solve the foregoing problem, a conveyance device in accordance with an aspect of the present invention is a conveyance device configured to convey a conveyance target along a conveyance path, the conveyance device including: a plurality of main carriages; and a plurality of sub-carriages that are located between the plurality of main carriages and that are connected so as to be movable with respect to the main carriages, the plurality of main carriages and the plurality of sub-carriages being alternately provided, and the plurality of sub-carriages each including a step configured to be drawn therefrom in an area in which the conveyance path bends and in a direction perpendicular to a movement direction of the conveyance path.

Advantageous Effects of Invention

According to an aspect of the present invention, it is possible to achieve a conveyance device having a reduced gap between each of carriages and a platform.

DESCRIPTION OF EMBODIMENTS

Embodiment 1

Figure 1:
FIG. 1 is a perspective view illustrating an overview of a conveyance device.

The following description will discuss an embodiment in accordance with an aspect of the present invention (hereinafter, also referred to as "present embodiment") with reference to the drawings. In the drawings, the same or corresponding parts are denoted by the same reference numerals, and descriptions thereof will not be repeated.
(Basic Configuration of Conveyance Device 1)

FIG. 1 is a perspective view illustrating an overview of the conveyance device 1. The conveyance device 1 is constituted by a plurality of main carriages 2 and a plurality of sub-carriages 3. The main carriages 2 and the sub-carriages 3 are alternately provided. On the main carriages 2, conveyance targets 4 are placed. Operators 5 board on the main carriages 2 and the sub-carriages 3 and perform operations for the conveyance targets 4. The operators 5 load, on the main carriages 2 and the sub-carriages 3, components to be mounted to the conveyance targets 4. The operators 5 finish assembling a conveyance target on each of the main carriages 2 in a time period during which the main carriages 2 and the sub-carriages 3 move along a predetermined conveyance path 6. Note that a fixed platform 9 may be provided beside the conveyance path 6. The floor level of the platform 9 is substantially equal to that of the conveyance device 1.

The main carriages 2 are guided by the conveyance path 6, which is, for example, a guide rail provided on a floor, and travel along the conveyance path 6. Each of the main carriages 2 has a contour which has arc portions at the front and back with respect to a movement direction of the conveyance path 6 and which has edges parallel to the movement direction of the conveyance path 6. That is, each of the main carriages 2 has a substantially circular shape which is made by cutting out parts from a circle and which has edges parallel to the movement direction of the conveyance path 6. Each of the sub-carriages 3 has a shape having a pair of depressions with respect to the movement direction of the conveyance path 6 and, for example, has an I-shape. Specifically, the depressions of the sub-carriages 3 are shaped so as to fit edges of the main carriages 2.

In a straight path area of the conveyance path 6, the edges of the main carriages 2 parallel to the movement direction of the conveyance path 6 and the corresponding edges of the sub-carriages 3 are arranged in a straight line. That is, if each of the main carriages 2 has a shape of the circle, the main carriage 2 protrudes from the edges of the sub-carriages 3 in the straight path area of the conveyance path 6. In order to prevent such protrusion of the main carriages 2, edges of the contour of the main carriages 2 are each shaped by cutting out portions from a circle. As a result, in the straight path area of the conveyance path 6, the conveyance device 1 and the platform 9 are positioned parallel to each other. Thus, a large gap is not made.

In the present embodiment, a driving system of each of the main carriages 2 is a friction system. Note, however, that the driving system is not limited to this. Another system, such as a chain drive, is also possible. Alternatively, each of the main carriages 2 may have a self-propelled function. Note that the sub-carriages 3 do not have driving mechanisms and move by following the main carriages 2.

(Main Carriage 2)

Figure 2:
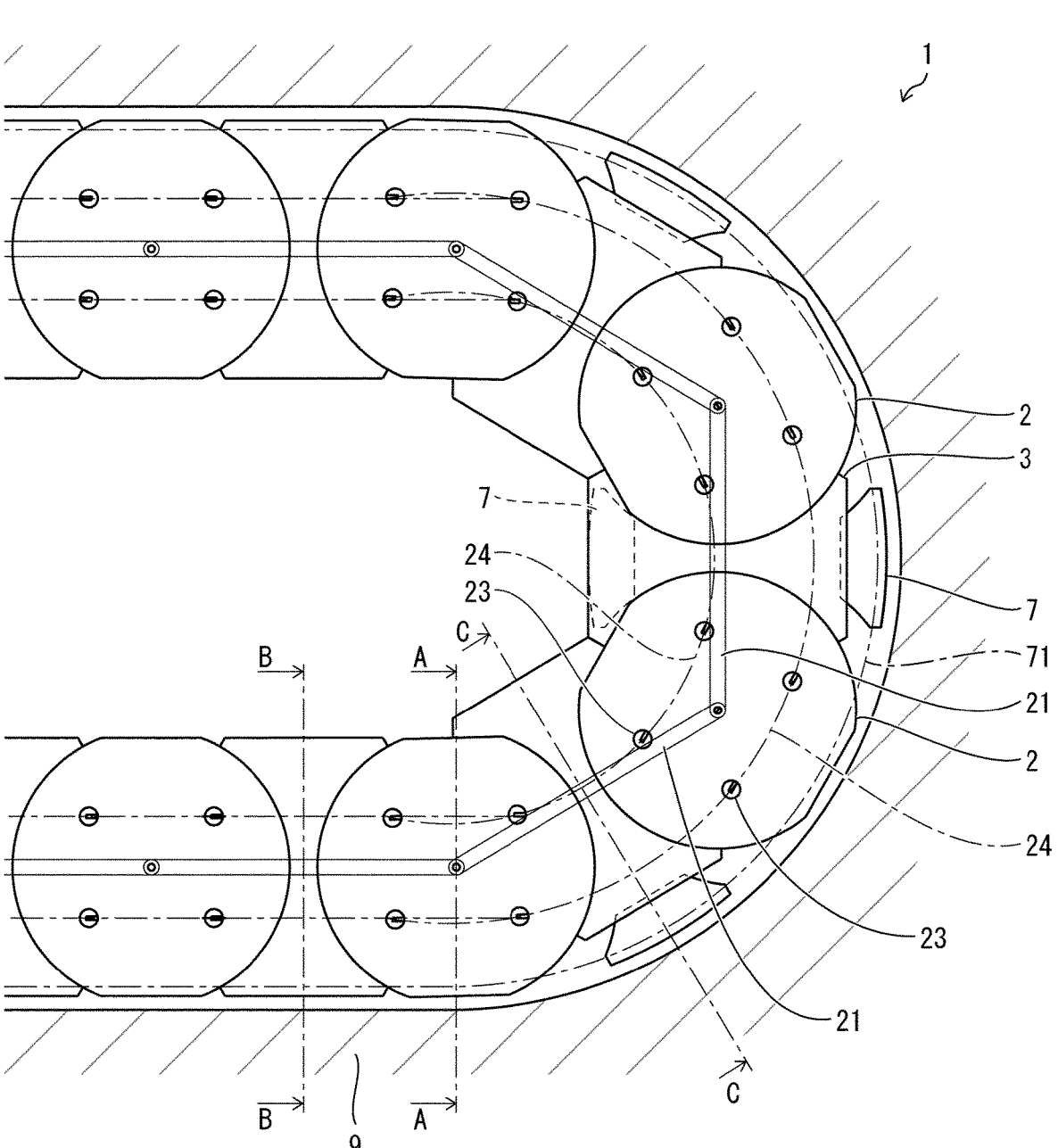
FIG. 2 is a top view illustrating a conveyance device at and in the vicinity of an area in which the conveyance path bends or turns around.

FIG. 2 is a top view illustrating the conveyance device 1 at and in the vicinity of an area in which the conveyance path 6 bends or turns around. Note that the conveyance path 6 is also a track along which the center of each of the main carriages 2 passes.

Between the main carriages 2, a mechanism is provided which maintains a certain space between the main carriages 2. For example, a mechanism is provided in which rods 21 each having both ends provided with rotation shafts which are, for example, made of bearings are used to connect the centers of the main carriages 2. Via the rods 21, a force applied from a traveling part to cause the main carriages 2 to travel is transmitted. Each of the rods 21 has the rotation shafts at both ends thereof. Therefore, each of the two main carriages 2 that are connected by the rod 21 can rotate (move) relative to the center of the other main carriage 2.

Each of the main carriages 2 has a plurality of traveling wheels 23 that travel on the conveyance path 6. The traveling wheels 23 rotate with use of the forces transmitted via the rods 21 and cause the main carriages 2 to travel along the conveyance path 6. Note that the reference numeral 24 in FIG. 2 indicates paths along which the traveling wheels 23 pass. In each of the traveling wheels 23, a portion to which the wheel is fixed rotates, and a direction in which the traveling wheel 23 rotates changes so that the traveling wheel 23 is parallel to the conveyance path 6.

In an outer periphery portion of each of the main carriages 2, an exposing guide rail 22 (see FIG. 3) which is a guide rail for guiding each of cover parts 8 described later is provided. The function of the exposing guide rail 22 will be described later.

(Sub-Carriage 3)

Each of the sub-carriages 3 is fixed to a middle of the rod 21. Therefore, each of the sub-carriages 3 is located at a middle between the centers of the main carriages 2. The sub-carriages 3 are connected so as to be movable (rotatable) with respect to the main carriages 2. The sub-carriages 3 are supported by the rods 21 and the main carriages 2. That is, the sub-carriages 3 are not necessary to have traveling wheels that travel on the floor surface.

The sub-carriages 3 each include steps 7 each configured to be drawn in a direction perpendicular to the movement direction of the conveyance path 6 (perpendicular to a vertical plane passing through the movement direction). The steps 7 are attached so as to be movable (slidable) with respect to the sub-carriages 3. Each of the steps 7 has a structural strength that allows the operator 5 to ride thereon. The steps 7 are stored below the sub-carriages 3 so as to be able to be exposed.

(Step 7)

Figure 3:
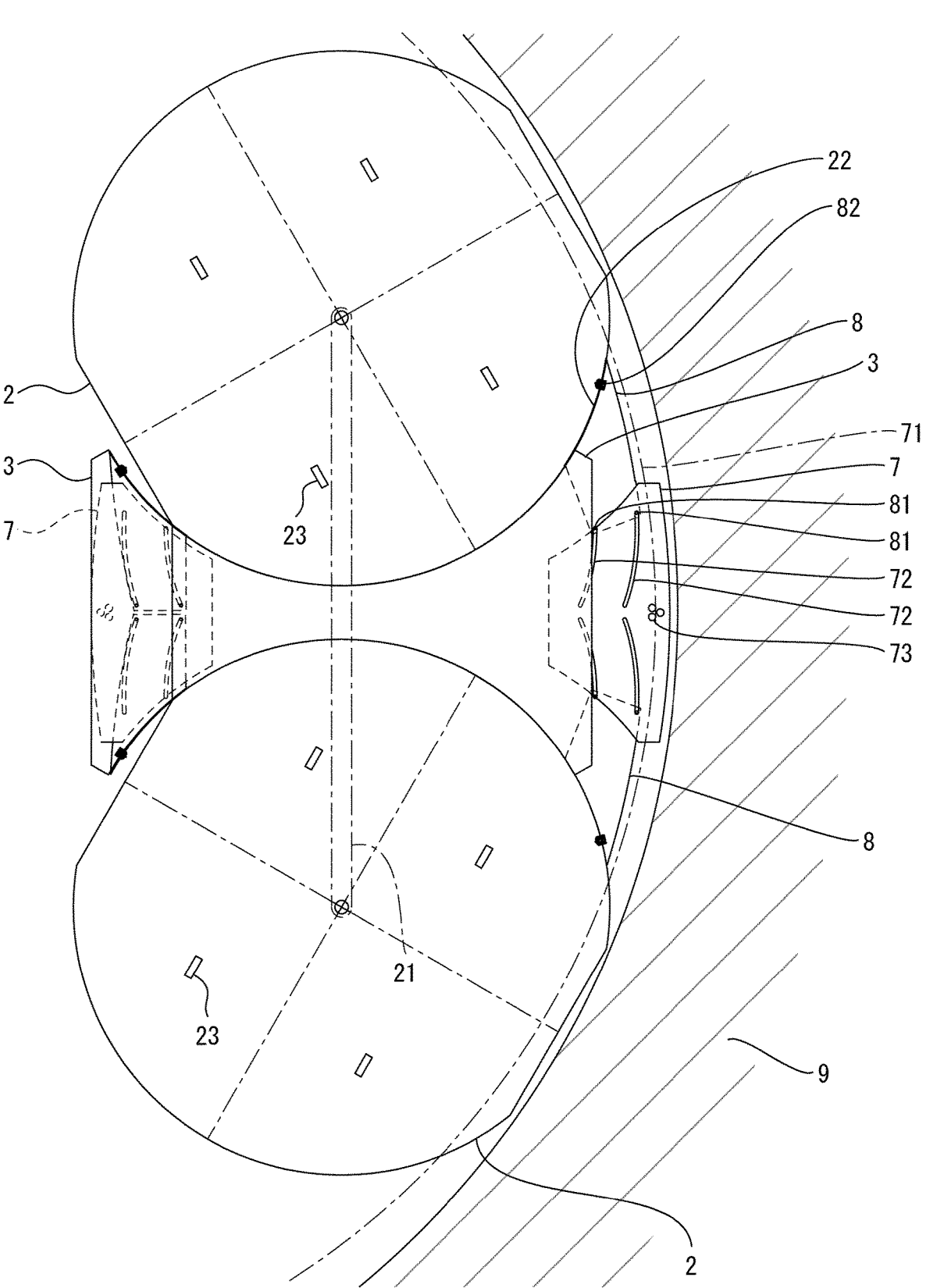
FIG. 3 is a top view illustrating a relationship between a pair of main carriages and a sub-carriage.

The steps 7 have top surfaces lower than those of the sub-carriage 3 and are stored below the sub-carriages 3 so as to be able to be exposed. FIG. 3 is a top view illustrating a relationship between a pair of the main carriages 2 and the sub-carriage 3. The pair of cover parts 8 is stored by the step 7 so as to be able to be exposed.

Each of the steps 7 includes a drawing guide roller 73 made of a plurality of rollers. The drawing guide roller 73 sandwiches each of drawing guide rails 71 (guide rails) provided substantially parallel to each other along the conveyance path 6 installed on the floor. The drawing guide roller 73 rolls along the corresponding one of the drawing guide rails 71. Therefore, the step 7 engages with the drawing guide rail 71 provided along the conveyance path 6 and is drawn from the sub-carriage 3 by a path difference between the drawing guide rail 71 and the track along which the center of the sub-carriage 3 passes. The step 7 is drawn from the sub-carriage 3 in a necessary area on the conveyance path 6, in particular, in an area in which the conveyance path 6 bends. Here, the path difference means that although the track of the center of the sub-carriage 3 agrees with the conveyance path 6 in the straight zone, the track turns in a smaller radius than the conveyance path 6 in the bending zone, and therefore the sub-carriage 3 moves away from the drawing guide rail 71 in the bending zone.

Note that it is possible that the drawing guide rails 71 are provided in an area in which the conveyance path 6 bends and are absent at least in an area in which the conveyance path 6 is straight. In the present embodiment, the drawing guide rail 71 is provided so as to correspond to the entire conveyance path 6.

A pin 81 provided in each of the cover parts 8 is fitted into the corresponding one of curving slots 72 in each of the steps 7 and slide along the slot 72. Each of the slots 72 has a shape of a curve arched like a bow. The pin 81 is not limited to a pin and may be a bearing or a roller.

An exposing guide roller 82 (movable mechanism) provided to each of the cover parts 8 sandwiches the exposing guide rail 22 and rolls or slides along the exposing guide rail 22. That is, the exposing guide roller 82 moves on the outer edge of the main carriage 2 along the exposing guide rail 22.

The position of each of the cover parts 8 depends on the position of the pin 81 and the position of the exposing guide roller 82. That is, the cover part 8 is positioned by a positional relationship between the step 7 and the corresponding one of the main carriages 2. That is, the cover part 8 can move between the step 7 and the main carriage 2. In addition, the cover part 8 is restricted by the exposing guide rail 22 with use of the exposing guide roller 82 and thus is held by the main carriage 2.
(Storing and Exposing of Cover Part 8)

The cover parts 8 have top surfaces lower than those of the steps 7 and are stored below the steps 7 so as to be able to be exposed.

Figure 4:
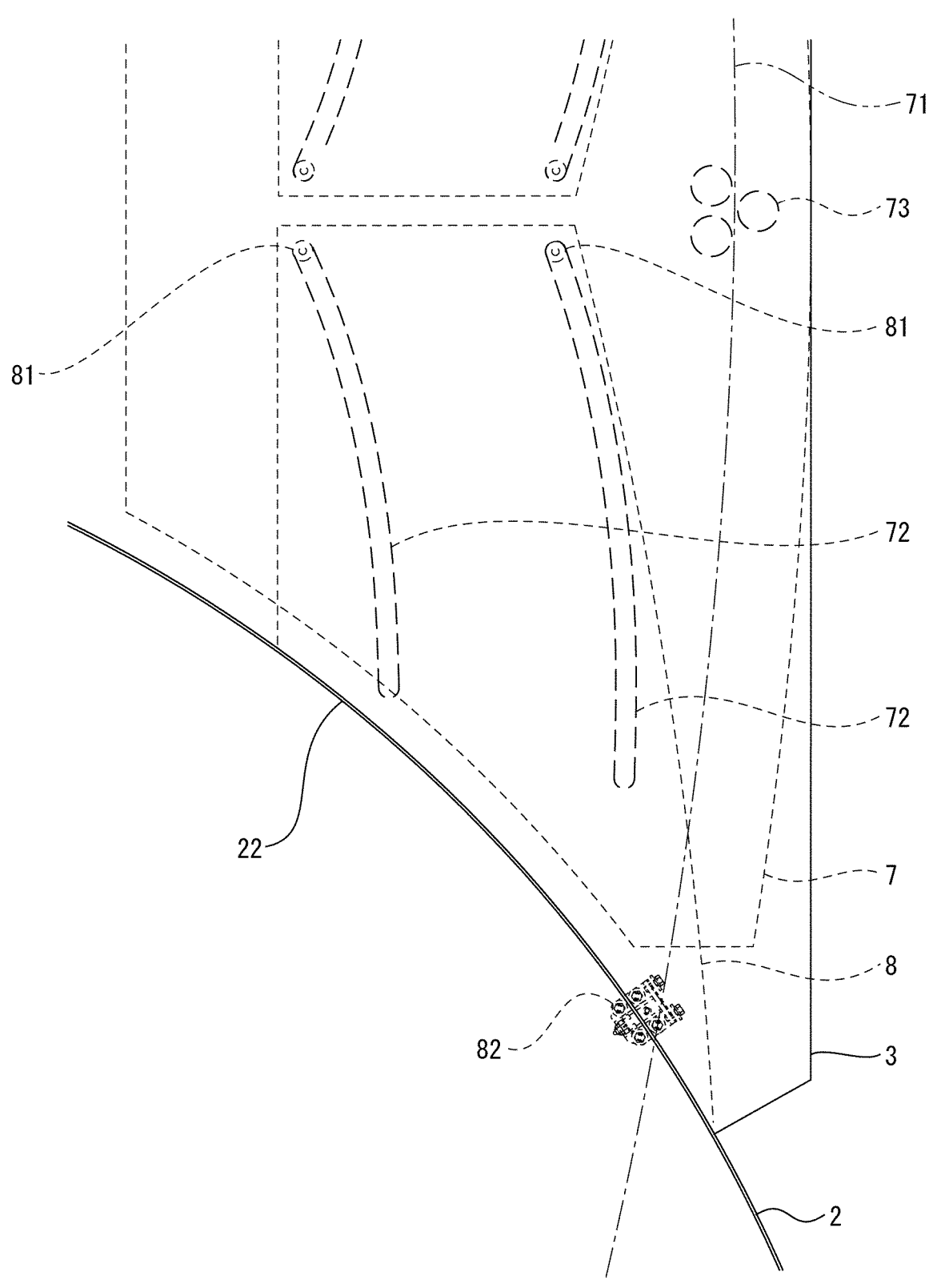
FIG. 4 is a top view illustrating a step and a cover part in a state in which the cover part is stored.
Figure 5:
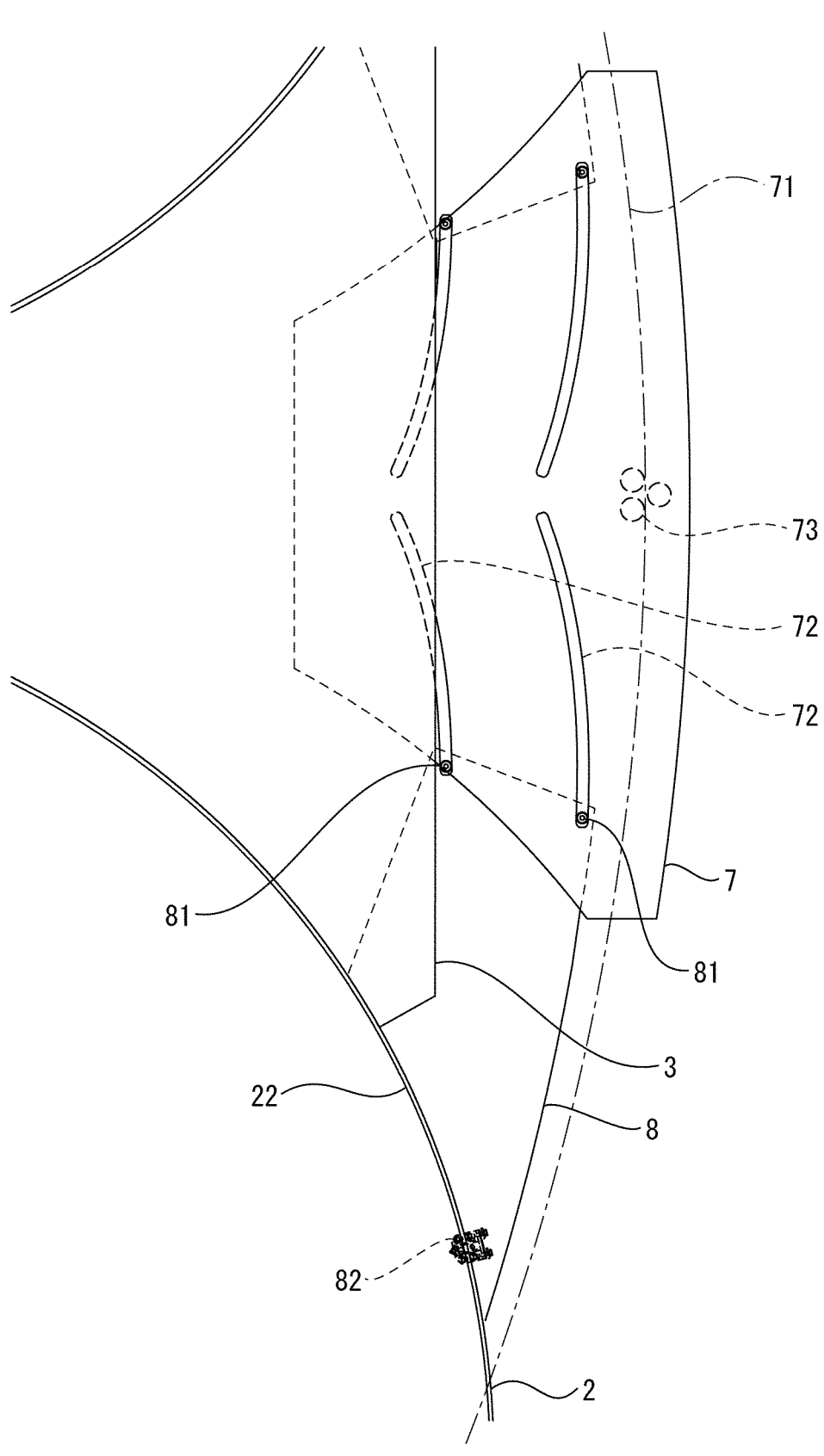
FIG. 5 is a top view illustrating the step and the cover part in a state in which the cover part is exposed.
Figure 6:
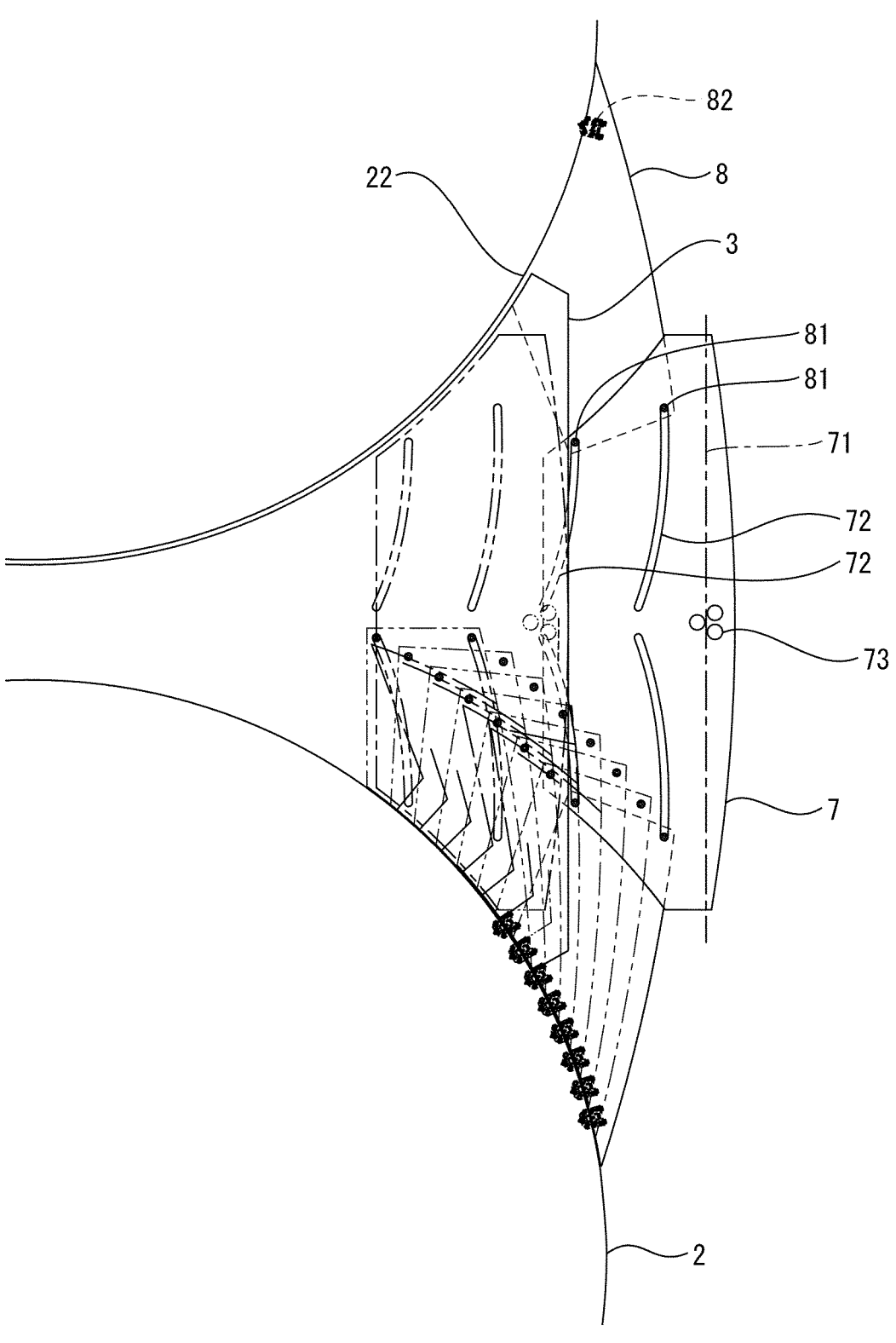
FIG. 6 is a view showing that the cover part transits from a stored state to an exposed state.

FIG. 4 is a top view illustrating the step 7 and the cover part 8 in a state in which the cover part 8 is stored. FIG. 5 is a top view illustrating the step 7 and the cover part 8 in a state in which the cover part 8 is exposed. FIG. 6 is a view illustrating a process in which the cover part 8 transits from a stored state to an exposed state.

In FIG. 4, the pins 81 are located at ends of the slots 72 on a center side. In contrast, in FIG. 5, the pins 81 are located at ends of the slots 72 opposite to the ends on a center side. The position of the exposing guide roller 82 relative to the exposing guide rail 22 differs between FIG. 4 and FIG. 5.

As illustrated in FIG. 6, the step 7 which includes the drawing guide roller 73 sandwiching the drawing guide rail 71 moves with respect to the sub-carriage 3 in a direction perpendicular to the movement direction of the conveyance path 6. During this movement, in the cover part 8, the position of the pin 81 relative to the slot 72 and the position of the exposing guide roller 82 relative to the exposing guide rail 22 are changed due to a change in the position of the step 7 relative to the main carriage 2. As a result, the position of the cover part 8 changes accordingly, as illustrated in FIG. 6. Thus, the cover part 8 transits from a state of being stored below the step 7 to a state of being exposed from the step 7 (see FIG. 6).

Therefore, the steps 7 and the cover parts 8 are drawn from the sub-carriages 3 in the area in which the conveyance path 6 bends or turns around. This makes it possible to reduce a gap between the platform 9 and the conveyance device 1. Specifically, in a case where the steps 7 and the cover parts 8 are not provided, large gaps are to be generated between the main carriages 2 and the sub-carriages 3; and the platform 9 in an area in which the conveyance path bends. However, in a case where the conveyance device 1 includes the steps 7 and the cover parts 8, it is possible to reduce gaps between the steps 7 and the cover parts 8; and the platform 9 to be smaller than the gap to be generated in the case described above (see FIG. 3).

In an area in which the conveyance path 6 is straight, the drawing guide rails 71 do not move outwards away from end parts of the sub-carriages 3, and thus the steps 7 and the cover parts 8 are stored by the sub-carriages 3.

Embodiment 2

The following description will discuss another embodiment of the present invention. For convenience of description, a member having a function identical to that of a member discussed in Embodiment 1 above is given an identical reference sign, and a description thereof is omitted.

Although the floor level of the conveyance device 1 is substantially equal to that of the platform 9 in Embodiment 1, the floor levels are different in Embodiment 2. In Embodiment 2, the floor level of the platform 9 is lower than that of the conveyance device 1. In addition, the platform 9 protrudes to a position below the conveyance device 1.

Figure 7:
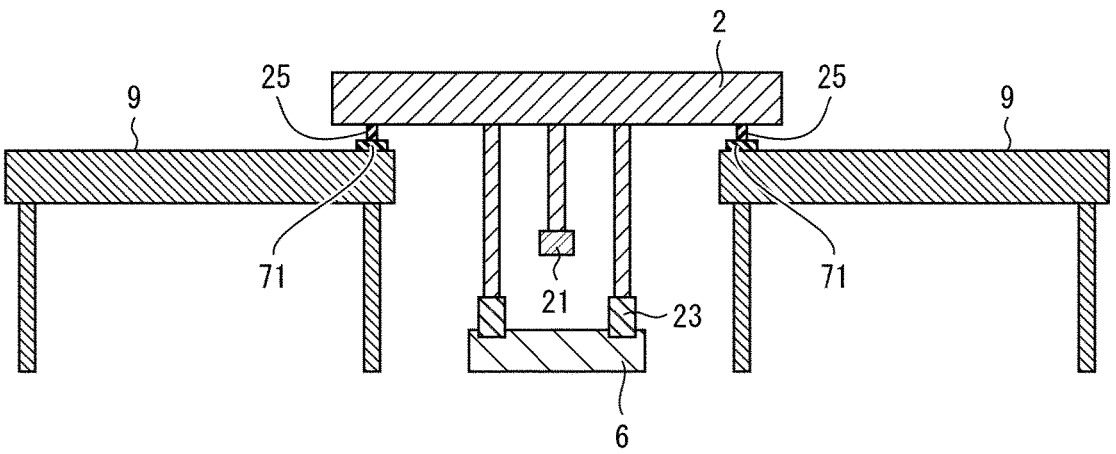
FIG. 7 is a cross-sectional view illustrating a main carriage in accordance with Embodiment 2 as viewed from a movement direction of a conveyance path.

FIG. 7 is a cross-sectional view illustrating each of main carriages 2 in accordance with Embodiment 2 as viewed from a movement direction of a conveyance path. The main carriages 2 each include auxiliary wheels 25. The auxiliary wheels 25 roll on drawing guide rails 71. Note that the drawing guide rails 71 are installed on the platform 9 instead of the floor surface. That is, the platform 9 supports loads of the main carriages 2 and loads of conveyance targets 4 being conveyed by the main carriages 2.

Figure 8:
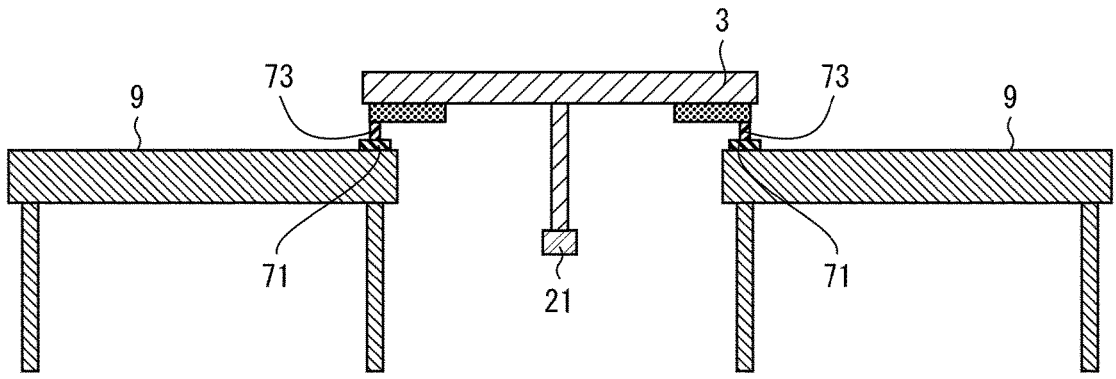
FIG. 8 is a cross-sectional view illustrating a sub-carriage in accordance with Embodiment 2 as viewed from the movement direction of the conveyance path in a state in which the step and the cover part are stored.
Figure 9:
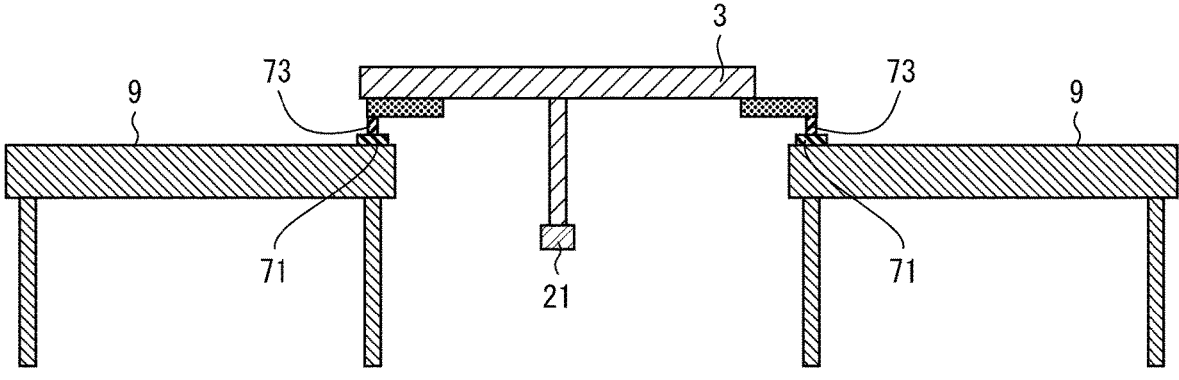
FIG. 9 is a cross-sectional view illustrating the sub-carriage in accordance with Embodiment 2 as viewed from the movement direction of the conveyance path in a state in which the step and the cover part are exposed.

FIG. 8 is a cross-sectional view illustrating each of sub-carriages 3 in accordance with Embodiment 2 as viewed from the movement direction of the conveyance path in a state in which steps 7 and cover parts 8 are stored. FIG. 9 is a cross-sectional view illustrating the sub-carriage 3 in accordance with Embodiment 2 as viewed from the movement direction of the conveyance path in a state in which the steps 7 and the cover parts 8 are exposed.

In the sub-carriages 3, drawing guide rollers 73 roll on the drawing guide rails 71, as in the case of the main carriages 2. Therefore, the platform 9 can support loads of the sub-carriages 3. The platform 9 can support the loads irrespective of states of the exposure of the steps 7 and the cover parts 8, as illustrated in FIGS. 8 and 9.

In Embodiment 2, the conveyance device 1 and the platform 9 differ in floor level and thus an area in which a gap is to be generated differs from that in Embodiment 1. That is, in Embodiment 2, a gap is to be generated between a side surface of the conveyance device 1 and a top surface of the platform 9 rather than between the top surface of the conveyance device 1 and the top surface of the platform 9. Therefore, in a case where side surfaces of the steps 7 and side surfaces of the cover parts 8 in the conveyance device 1 cover the vicinity of the top surface of the platform 9, it is possible to reduce a gap.

In order to prevent increase of a gap, it is preferable that, as described above, irrespective of the floor level of the platform 9, an area occupied by the top surface of the conveyance device 1 including the steps 7 and the cover parts 8 is uniform, while the conveyance device 1 operates. In the straight zone, each of the main carriages 2 has the same width as that of each of the sub-carriages 3, and therefore an area occupied by the top surface of the conveyance device 1 is uniform, while the conveyance device 1 operates. On the other hand, in an outer part of the conveyance device 1 in the bending zone, the steps 7 and the cover parts 8 cover a space to be generated by the movement of the sub-carriages 3 in a direction toward the inside of the path.
[Variation]
(Main Carriage has a Circular Shape)

In Embodiments 1 and 2, each of the main carriages 2 has the substantially circular shape which is a circle having a contour with arc portions at the front and back with respect to the movement direction of the conveyance path 6 and having edges parallel to the movement direction of the conveyance path 6. However, the main carriages 2 do not limited to this shape. For example, the shape of the main carriage 2 may be a perfect circle or a polygon.

In Embodiments 1 and 2, each of the main carriages 2 does not have a perfectly circular shape. In a case where the main carriage 2 has a perfectly circular shape like the present variation, the exposing guide roller 82 can always sandwich the exposing guide rail 22. Therefore, it is possible to smoothly expose the cover part 8.
(Zone in which Drawing Guide Rail is Installed)

In Embodiments 1 and 2, the two drawing guide rails 71 are provided to the conveyance path 6 so as to be substantially parallel to each other. However, this should not be construed as a limitation. The drawing guide rails 71 may be provided in at least an area in which the conveyance path 6 bends.

7

(Exposing Method for Steps 7)

In Embodiments 1 and 2, the steps 7 are configured to be automatically drawn by being guided by the drawing guide rails 71. However, the steps 7 are not limited to this. It is alternatively possible that the drawing guide rails 71 are not provided, and the steps 7 are configured to be drawn with power of a motor or the like. Similarly, the cover parts 8 can be configured to be drawn from the steps 7 with power of a motor or the like. In this case, the steps 7 and the cover parts 8 are preferably controlled to be drawn at a timing to cause the gap to be the smallest, on the basis of the positional information of the conveyance path.

Aspects of the present invention can also be expressed as follows:

In order to solve the foregoing problem, a conveyance device in accordance with Aspect 1 of the present invention is a conveyance device configured to convey a conveyance target along a conveyance path, the conveyance device including: a plurality of main carriages; and a plurality of sub-carriages that are located between the plurality of main carriages and that are connected so as to be movable with respect to the main carriages, the plurality of main carriages and the plurality of sub-carriages being alternately provided, and the plurality of sub-carriages each including a step configured to be drawn therefrom in an area in which the conveyance path bends and in a direction perpendicular to a movement direction of the conveyance path.

According to the above configuration, the step is configured to be drawn from the sub-carriage, so that it is possible to reduce the largest gap in a path along which the conveyance device passes.

A conveyance device in accordance with Aspect 2 of the present invention may be configured, in Aspect 1, such that the step engages with a guide rail provided along the conveyance path and is configured to be drawn from the sub-carriage due to a path difference between the guide rail and a track along which a center of the sub-carriage passes.

According to the above configuration, the guide rail causes the step to move from the sub-carriage. The movement of the step makes it possible to reduce a gap in the path along which the conveyance device passes.

A conveyance device in accordance with Aspect 3 of the present invention may be configured, in Aspect 2, such that: the guide rail is provided in an area in which the conveyance path bends; and the guide rail is completely or partially absent in an area in which the conveyance path is straight.

According to the above configuration, it is possible to reduce a gap to be generated in the bending area, in the path along which the conveyance device passes.

A conveyance device in accordance with Aspect 4 of the present invention may be configured, in any one of Aspects 1 to 3, such that the step includes cover parts between the step and corresponding ones of the plurality of main carriages, the cover parts being movable.

According to the above configuration, it is possible to further reduce, with use of the cover parts, a gap which only the step cannot completely cover, in the path along which the conveyance device passes.

A conveyance device in accordance with Aspect 5 of the present invention may be configured, in Aspect 4, such that the cover parts are at least partially stored by the step in an area in which the conveyance path is straight.

According to the above configuration, since the cover parts are stored by the steps, it is possible to cause the step to be easily stored by the sub-carriage. Therefore, in the straight area of the conveyance device, it is possible to prevent the conveyance device from interfering with the platform.

A conveyance device in accordance with Aspect 6 of the present invention may be configured, in Aspect 4 or 5, such that: the cover parts each have a movable mechanism that moves along an outer edge of a corresponding one of the plurality of main carriages; and the cover parts are held by the corresponding ones of the plurality of main carriages.

According to the above configuration, it is possible to cause the cover parts to be connected so as to be movable with respect to the main carriages.

A conveyance device in accordance with Aspect 7 of the present invention may be configured, in any one of Aspects 1 to 6, such that each of the plurality of sub-carriages has a shape having a pair of depressions with respect to a movement direction of the conveyance path.

According to the above configuration, it is possible to cause the sub-carriages to be in contact with the main carriages without gaps. Therefore, no gaps are made between the main carriages and the sub-carriages, so that it is possible to prevent the main carriages and the sub-carriages from catching a thing therebetween.

A conveyance device in accordance with Aspect 8 of the present invention may be configured, in any one of Aspects 1 to 7, such that each of the plurality of main carriages has a substantially circular shape which has arc contours at front and back with respect to a movement direction of the conveyance path and which has edges parallel to the movement direction of the conveyance path.

According to the above configuration, it is possible to prevent, in the straight zone in the conveyance path, the main carriages from further protruding than the sub-carriages. Therefore, it is possible to prevent, in the straight zone in the conveyance path, generation of a gap between the conveyance device and the platform.

ADDITIONAL REMARKS

The present invention is not limited to the embodiments, but can be altered by a skilled person in the art within the scope of the claims. The present invention also encompasses, in its technical scope, any embodiment derived by combining technical means disclosed in differing embodiments.

REFERENCE SIGNS LIST

1 Conveyance Device
2 Main carriage
3 Sub-carriage
4 Conveyance target
5 Operator
6 Conveyance path
7 Step
8 Cover part
9 Platform
21 Rod
22 Exposing guide rail
23 Traveling wheel
71 Drawing guide rail (guide rail)
72 Slot
73 Drawing guide roller
81 Pin
82 Exposing guide roller (movable mechanism)

The invention claimed is:

1. A conveyance device configured to convey a conveyance target along a conveyance path, the conveyance device comprising:

a plurality of main carriages; and a plurality of sub-carriages that are located between the plurality of main carriages and that are connected so as to be movable with respect to the main carriages, the plurality of main carriages and the plurality of sub-carriages being alternately provided, and the plurality of sub-carriages each including a step configured to be drawn therefrom on an outer side of an area in which the conveyance path bends and in a direction perpendicular to a movement direction of the conveyance path.

2. The conveyance device according to claim 1, wherein each of the plurality of sub-carriages has a shape having a pair of depressions with respect to a movement direction of the conveyance path.

3. The conveyance device according to claim 1, wherein each of the plurality of main carriages has a substantially circular shape which has arc contours at front and back with respect to a movement direction of the conveyance path and which has edges parallel to the movement direction of the conveyance path.

4. A conveyance device configured to convey a conveyance target along a conveyance path, the conveyance device comprising:

a plurality of main carriages; and a plurality of sub-carriages that are located between the plurality of main carriages and that are connected so as to be movable with respect to the main carriages, the plurality of main carriages and the plurality of sub-carriages being alternately provided, and the plurality of sub-carriages each including a step configured to be drawn therefrom in an area in which the conveyance path bends and in a direction perpendicular to a movement direction of the conveyance path;

wherein the step engages with a guide rail provided along the conveyance path and is configured to be drawn from the sub-carriage due to a path difference between the guide rail and a track along which a center of the sub-carriage passes.

5. The conveyance device according to claim 4, wherein:

the guide rail is provided in an area in which the conveyance path bends; and the guide rail is completely or partially absent in an area in which the conveyance path is straight.

6. A conveyance device configured to convey a conveyance target along a conveyance path, the conveyance device comprising:

a plurality of main carriages; and a plurality of sub-carriages that are located between the plurality of main carriages and that are connected so as to be movable with respect to the main carriages, the plurality of main carriages and the plurality of sub-carriages being alternately provided, and the plurality of sub-carriages each including a step configured to be drawn therefrom in an area in which the conveyance path bends and in a direction perpendicular to a movement direction of the conveyance path;

wherein the step includes cover parts between the step and corresponding ones of the plurality of main carriages, the cover parts being movable.

7. The conveyance device according to claim 6, wherein the cover parts are at least partially stored by the step in an area in which the conveyance path is straight.

8. The conveyance device according to claim 6, wherein:

the cover parts each have an exposing guide roller that moves along an exposing guide rail provided in an outer edge of a corresponding one of the plurality of main carriages; and the cover parts are held by the corresponding ones of the plurality of main carriages.

* * * * *